United States Patent Office 3,171,864
Patented Mar. 2, 1965

3,171,864
PROCESS FOR MANUFACTURING CONJUGATED DIOLEFINS
Geneviève Clement, Coeuilly - Champigny, and Jean-Claude Balaceanu, Paris, France, assignors to Institut Francais du Pétrole, des Carburants et Lubrifiants, Paris, France
No Drawing. Filed Oct. 3, 1960, Ser. No. 59,835
9 Claims. (Cl. 260—681)

The present invention relates to a process for manufacturing conjugated diolefins, more particularly, from mono-olefins or starting materials containing the same.

The greater number of known processes for manufacturing conjugated diolefins requires the use of reactants which are too costly to be employed in a process carried out on an industrial scale. However, cheaper processes do exist using as starting materials petroleum derivatives, such as processes of direct dehydrogenation of paraffinic and olefinic hydrocarbons.

Unfortunately, such processes lead in most cases to the formation of mixtures of olefinic and diolefinic hydrocarbons, wherein the latter are either conjugated or not and which are difficult to separate from each other. This is a very serious drawback when using such conjugated di-olefins as starting materials in the production of plastic materials and synthetic rubber and the like involving polymerization, co-polymerization or condensations such as the Diels-Alder condensations which are described, for instance, in "Organic Reactions," vol. IV, published by John Wiley & Sons, New York.

Moreover, this dehydrogenation of paraffins and of mono-olefins must be carried out in the vapor phase at elevated temperatures which are necessary due to the strongly endothermic reactions taking place in these processes. For example, the dehydrogenation of a mono-olefin is achieved by passing the gaseous olefin over a catalyst bed of, for instance, chromic oxide deposited on an alumina support at a temperature above 600° C. and under reduced pressure, which conditions require frequent regenerations of said catalyst. Other known processes also necessitate the use of relatively high temperatures on the order of 650° C. and, consequently, lead to high consumptions of previously overheated water vapor so as to supply to the reaction the major portion of the necessary calories and, moreover, to reduce the partial pressure of the treated mono-olefins.

The increased temperatures which are necessary in order to effect these reactions are due to the strong endothermic nature of the latter which amounts, for instance, to a consumption of 22 kilo-calories per mole of mono-olefin converted to diolefin.

Furthermore, these known processes are of very poor selectivity in that they lead to the formation, besides the desired conjugated diolefins, of residual cracking gases and other lighter olefins.

It is therefore the principal object of our invention to provide a process for producing conjugated diolefins from mono-olefinic containing starting materials consisting of a petroleum fraction.

It is another object of our invention to achieve the conversion of mono-olefins contained in a petroleum cut in such a manner as to produce selectively conjugated diolefins and to make the separation of the latter from the reaction mixture easier than in the known processes.

It is still another object of our invention to provide a process as described above, in which the consumption of heat per converted mole of olefin is much lower than in the known processes.

These and other objects and advantages, as may be apparent from the following specification and claims, are achieved according to this invention, which essentially comprises a two-stage process consisting of a first stage of contacting with gaseous oxygen or an oxygen-containing gas such as air, the olefinic starting material in the liquid phase or dissolved in a solvent therefor, thereby converting said olefinic material to the corresponding hydroperoxides and, of a second stage, of converting said hydroperoxides to the corresponding conjugated diolefins by means of a catalyst as hereafter defined.

According to this two-stage process of this invention conjugated diolefins are obtained from olefins or distillation cuts containing the same with a high selectively. This process may be carried out either as a batch process or continuously. As starting materials there can be used, more particularly, aliphatic, cyclic and alicyclic olefins having at least 4 carbon atoms in the molecule and preferably: aliphatic straight- or branched-chain olefins of the general formula:

$$C_nH_{2n}$$

wherein $n$ is an integer at least equal to 4.

Cyclic and alicyclic olefins of the general formula:

$$C_mH_{2m-2}$$

wherein $m$ is an integer at least equal to 5, said olefins having preferably from 5 to 8 carbon atoms in their ring.

As specific examples of such olefins which can be treated according to the process of our invention there may be mentioned: butenes, pentenes, hexenes, heptenes, decenes, dodecenes, hexadecenes, octadecenes, cyclopentene, cyclohexene, cycloheptene, cyclooctene and their derivatives having one or more substituting radicals such as methyl, ethyl, propyl, isopropyl, butyl, isobutyl, and tertiarybutyl radicals.

Said olefins may also be substituted by halogen atoms (fluorine, chlorine, bromine) or by carboxy or alkoxycarbonyl radicals.

According to this invention the olefinic material in the liquid state, or otherwise dissolved in a liquid solvent, is in a first stage oxidized by contacting therewith gaseous oxygen or an oxygen-containing gas such as air, whereby it is converted to the corresponding hydroperoxides and, in a second stage said hydroperoxides are converted to the corresponding conjugated diolefins by means of a catalyst such as hereafter defined.

The pressure at which the reaction is carried out must be high enough to keep the olefin in the liquid or dissolved state under the prevailing conditions during the reaction. Thus, in the absence of a solvent, atmospheric pressure is preferably used only for the treatment of higher olefins while the lower olefins will be treated under super-atmospheric pressures.

However, the use of a solvent of lower volatility than that of the olefinic starting material makes it possible to substantially reduce the pressure under which the reaction must be carried out and even, in some cases, to operate under atmospheric pressure when treating light olefins.

According to the kind of olefinic material to be treated, the reaction temperature may be chosen at quite different levels. However, temperatures of more than 100° C. must be avoided and, for the sake of convenience, temperatures lower than the ambient temperature are also avoided. In most cases the reaction temperature will be selected within the range of from 50° C. to 80° C.

The reaction velocity is dependent to a certain extent on the contact surface area of the reactants, oxygen and olefin, with each other. It is, therefore, convenient to ensure the finest dispersion of the two phases in one another. This may be achieved, for instance, by circulating one of the two phases throughout the other phase, by circulating the two phases in the same direction or countercurrently, or merely by stirring the reaction mixture.

The solvents to be used must fulfill the two following conditions:

(a) They must be inert under the operating conditions, i.e. they must not react either with oxygen or with the olefin or become decomposed or converted during the reaction.

(b) They must have a boiling temperature which is different from that of the treated olefin so as to be easily separated therefrom by distillation. In most cases a solvent may be used having a boiling point higher than that of the olefin and also above 60° C.

Among the solvents fulfilling the above conditions it may be mentioned, for instance, benzene and its chloroderivatives as well as a mixture consisting of benzene having added thereto nitrobenzene in proportion of 2 to 10% by weight (in view of avoiding the formation of polymers). Higher aromatic hydrocarbons may also be used as well as their fluoroderivatives.

The auto-oxidation reaction is favored by the use of initiators such as the hydroperoxide produced by the reaction. When the process is carried out in a continuous manner, the convenient proportion of initiator in the reaction mixture may be obtained by maintaining in the reaction vessel a constant concentration of the reaction product, which may be achieved by adjusting the feed of the reactants taking into account the conversion velocity of the same into the reaction vessel.

The feeding rate of the olefin is therefore adapted to the capacity of the reaction vessel so as to maintain substantially unchanged the concentration of hydroperoxides in the latter in spite of the continuous withdrawal of a fraction of the reaction mixture. The said rate of withdrawal is adjusted depending upon the feeding rate, the capacity of the reaction vessel and the conversion rate of the olefins, the rate of withdrawal being in inverse ratio to the hydroperoxide concentration of the withdrawn reaction mixture.

It has been discovered that it is necessary to hold the concentration of the formed hydroperoxide relatively low in order to avoid their decomposition or conversion to undesirable, difficultly separable by-products. Therefore, it is preferred generally to operate at a constant hydroperoxide concentration of the order of, for instance, 2% to 20% so as to obtain very pure products. This concentration is currently or intermittently controlled through the process.

Adjustment, when necessary, is effected by adjusting the flow rate of the reactants into the reaction zone. It is thus possible, when proceeding according to said conditions, to obtain the hydroperoxides with a yield close to 100% by weight of the consumed starting olefin.

When it is desired to adopt very weak conversion rates, it is always possible to regulate the flow rates of the reactants with regard to the reaction vessel capacity in such a manner as to establish the desired sufficient stationary concentration of hydroperoxides in the reaction vessel. In any case, the solution of hydroperoxides in the treated olefin which is withdrawn from the reaction mixture can, if necessary, be concentrated at room temperature under reduced pressure; in this case the evaporated and recondensed olefin can be recycled into the reaction vessel.

According to a preferred embodiment of this invention the hydroperoxide produced at the end of the first stage of the process is separated from the unreacted olefin, for instance, by distillation of the latter which is thereafter recycled to the reaction vessel, whereas an inert solvent is progressively added so as to replace the olefin in the proportion of the removal of the latter.

Such a solvent must comply with the following requirements:

(1) To have a boiling temperature, particularly under reduced pressure, which is substantially higher than that of the starting olefin or that of the diolefin produced at the end of the second stage of the reaction, so as to avoid any risk of being carried over during the eventual distillation of said compounds.

(2) To dissolve to a sufficient extent the hydroperoxide.

(3) To be inert during the reaction in regard to the hydroperoxide, the olefin, the diolefin and the hydroperoxide decomposing catalyst.

As examples illustrating the types of solvents complying with the two last conditions, within which a selection may be made according to the characteristics of the starting olefin so as to fulfill the first condition, the following list is given without intending to have this invention limited in any way to the same:

Alcohols such as, for instance, n-propanol, n-butanol or n-octanol,

Polyhydric alcohols such as, for instance, propyleneglycol or glycerin,

Ethers such as, for instance, butyl-ether,

Aliphatic, aromatic or cyclo-aliphatic hydrocarbons such as, for instance, decane, benzene, tetrahydronaphthalene or decahydronaphthalene, tetrahydronaphthalene being preferred in consideration of its better solvent power and its higher inertness.

The hydroperoxide solution or concentrate is then decomposed, preferably in the liquid phase, during the second stage of the process, in the presence of a catalyst consisting either of water or of aqueous diluted solutions of acids or of mineral or organic water-soluble salts such as, for instance, oxalic-, paratoluene sulfonic-, hydrochloric- or acetic-acid, magnesium-, zinc-, or iron-chloride, or magnesium sulphate, the simultaneous use of these various substances being also possible.

In most cases satisfactory results are obtained when these substances are used in amounts of less than 10 percent by weight of the aqueous catalytic solution. It is undesirable to exceed this value since higher proportions lead to the formation of excessive amounts of by-products resulting from secondary reactions. However, the best results are achieved when using concentrations in the range of from 0.1 to 2 percent.

The aqueous catalytic solution will advantageously have a pH value of less than 8 and preferably between 2 and 7.

The temperature at which the hydroperoxide is decomposed in most cases ranges between 20° C. and 300° C. and more particularly within the range of from 50° C. to 250° C., the tertiary hydroperoxides being generally decomposed at a temperature as low as 50° C. whereas temperatures of more than 150° C. are in most cases required for decomposing secondary and primary hydroperoxides.

It is thus possible, by means of an appropriate regulation of the temperature conditions, to selectively convert tertiary hydroperoxides to the corresponding conjugated diolefins, without substantially decomposing secondary and primary hydroperoxides, which selectivity appears as one of the major advantages of the process of our invention.

Due to this character of selecstivity of the reaction, mixtures of olefins of different natures may be treated according to this invention. As starting material there may be used, for instance, olefin-containing mixtures such as cracking or reforming cuts.

The reaction of decomposition of the hydroperoxide may be carried out either under atmospheric or non-atmospheric pressure. Thus tertiary hydroperoxide may be decomposed in the liquid phase at relatively low temperature under the atmospheric pressure. On the contrary, when higher temperatures are necessary for carrying out the decomposition of the olefin, it is in most cases necessary to proceed under superatmospheric pressure.

The reaction mixture is then fractionated by conventional physical means such as decantation or distillation.

The process according to this invention will now be further illustrated by a number of examples, which are, however, not to be considered as limitative of the scope of the invention.

Example I

Into a reaction vessel having a capacity of 250 liters, provided with stirring means, at its lower part with an inlet port for introducing oxygen and the starting olefin to be treated, at its upper part with an outlet port for withdrawing the reaction mixture, there are introduced 200 liters of cyclohexene in admixture with 3 liters of cyclohexenyl-(3) hydroperoxide acting as an initiator.

Air, circulated in closed cycle, is caused to bubble into said mixture maintained at a temperature of about 55° C. under atmospheric pressure until a hydroperoxide concentration of 16% by weight is obtained, the concentration being controlled intermittently through the process by adding sodium iodide to a sample of the reaction mixture acidified with acetic acid and thereafter dosing liberated iodine by means of sodium hyposulfite.

When the concentration attains said level (16%) the reaction mixture is withdrawn at a flow rate of 18 kilograms per hour, while the bubbling of air still continues and the olefin feeding rate is simultaneously regulated so as to maintain at a substantially constant level the volume of the reaction mixture in the reaction vessel and its hydroperoxide concentration.

The thus obtained hydroperoxide solution is then concentrated under vacuum at the ambient temperature up to achievement of a concentration of about 40% by weight. 63 liters of said concentrated solution, in admixture with 63 liters of an aqueous solution having a 2% by weight content of magnesium chloride, are thereafter heated to about 200–220° C. in an autoclave for 20 minutes. After cooling the organic phase is separated and distilled. 1,780 grams of cyclohexadiene-1,3 are thus recovered.

Example II

Example I is repeated except that the hydroperoxide concentrated solution is heated in the autoclave for 40 minutes at 200–220° C. There are thus obtained 3,000 grams of cyclohexadiene-1,3.

Example III

Example I is repeated except that the aqueous solution has a magnesium chloride content of 0.5 percent by weight and is heated in admixture with the concentrated hydroperoxide solution in the autoclave for 40 minutes at a temperature of 160–200° C. There are thus obtained 3,735 grams of cyclohexadiene-1,3.

Example IV

Example I is repeated except that the aqueous solution of magnesium chloride is replaced by an equal amount (63 liters) of water which is heated, in admixture with the concentrated hydroperoxide solution, for 60 minutes at a temperature of 180–200° C. There are thus obtained 1,780 grams of cyclohexadiene-1,3.

Example V

Example I is repeated, except that the aqueous solution of magnesium chloride is replaced by an equal amount (63 liters) of an aqueous solution having a 2% content by weight of magnesium sulphate and that the concentrated hydroperoxide solution in admixture therewith is heated to 150–200° C. for 45 minutes. There are thus obtained 3,200 grams of cyclohexadiene-1,3.

Example VI

Into the same reaction vessel as described in Example I there are introduced 200 liters of 3-methyl 1-butene in admixture with 1.5 liters of 3-methyl butenyl-(1) hydroperoxides acting as initiator.

The mixture, brought to a temperature of 78° C., is then stirred in the presence of oxygen under a partial pressure of one atmosphere, the total pressure thus being of about 1.5 atmospheres. The reaction is continued until a 5% concentration by weight of hydroperoxides in the solution is obtained.

The reaction mixture is then withdrawn at a flow rate of 6.6 kilograms per minute whereas the olefin feeding rate is adjusted so as to maintain the reaction volume in the reaction vessel substantially constant. The solution of the hydroperoxide in the olefin is then evaporated under vacuum until a 20% hydroperoxide concentration by weight is achieved. 63 liters of said concentrated solution are thereafter treated as according to Example I, except that the aqueous solution of magnesium chloride is replaced by an equal volume of an aqueous solution of oxalic acid having a 10% content of the latter and that the concentrated hydroperoxide solution, in admixture therewith, is heated to 60° C. for 90 minutes. There are thus obtained 1.340 kilograms of isoprene.

Example VII

A solution of cyclohexenyl-(3) hydroperoxide in cyclohexene having a 50% content by weight of each compound is prepared by the same way as described in Example I. 84 liters of said solution, in admixture with 42 liters of an aqueous solution of magnesium chloride having a 0.5 percent content by weight of the latter, are then heated to 170° C. for one hour. After cooling and decantation the organic phase is distilled. There are thus obtained 5,880 grams of cyclohexadiene-1,3.

Example VIII

Example VII is repeated except that 42 liters of said cyclohexenyl-(3) hydroperoxide solution are admixed with 84 liters of the aqueous solution of magnesium chloride containing 0.5% by weight of the latter, the treatment being otherwise the same as described in Example VII. There are thus obtained 3,535 grams of cyclohexadiene-1,3.

Example IX

Into an autoclave there are introduced 200 liters of 3-methyl 1-butene having admixed thereto 1.2 liters of the corresponding methyl butenyl hydroperoxides, acting as initiator. The mixture, brought to a temperature of 80° C., is then stirred in the presence of oxygen, the total pressure in the autoclave being about 7.5 atmospheres. The reaction is continued until the reaction mixture attains a 5% by weight hydroperoxide content. Said mixture is then withdrawn at a flow rate of 6.6 kilograms per minute, the olefin feeding rate being simultaneously adjusted so as to keep constant the volume of the reaction mixture in the reaction vessel.

The solution of methylbutenyl hydroperoxide in the 3-methyl-1-butene may be rapidly brought to a 70% concentration by weight of the hydroperoxide, by evaporation under reduced pressure (10 mm. Hg) at the ambient temperature. The 3-methyl 1-butene thus recovered may be recycled to the reaction vessel. The concentrate is then diluted by means of tetrahydronaphthalene and the remaining part of the 3-methyl 1-butene is evaporated until traces of the latter (i.e., about 0.1%) are present in the resulting solution.

16.2 kilograms of said resulting solution, containing 9.7 kilograms of methyl butenyl hydroperoxides (corresponding to a 60% concentration by weight of the latter), are admixed to 63 liters of a 10% by weight aqueous solution of oxalic acid, and the mixture is heated to 80–90° C. for 80 minutes. After decantation and distillation there are recovered 1,360 grams of isoprene.

It will be understood that, while there have been given herein certain specific examples of the practice of this invention, it is not intended thereby to have this invention limited to or circumscribed by the specific details of materials, proportions or conditions herein specified, in view of the fact that the invention may be modified according to individual preference or conditions without necessarily

What we claim is:

1. A process for manufacturing a conjugated diolefin, which comprises contacting an olefinic hydroperoxide containing at least 4 carbon atoms per molecule with a liquid catalyst consisting essentially of 90 to 100% by weight of water and 0 to 10% by weight of a member of the group consisting of acids, magnesium chloride, magnesium sulfate, and zinc chloride, said liquid catalyst having a pH lower than 8, thereby obtaining the conjugated diolefin directly.

2. A process for manufacturing a conjugated diolefin, which comprises contacting, at a temperature of from 50° to 250° C., an olefinic hydroperoxide containing at least 4 carbon atoms per molecule with a liquid catalyst consisting essentially of 90 to 100% by weight of water and 0 to 10% by weight of a member of the group consisting of acids, magnesium chloride, magnesium sulfate, and zinc chloride, said liquid catalyst having a pH lower than 8, thereby obtaining the conjugated diolefin directly.

3. A process for manufacturing a conjugated diolefin, which comprises contacting an olefinic hydroperoxide containing at least 4 carbon atoms per molecule with a liquid catalyst consisting essentially of 90 to 100% by weight of water and less than 10% by weight of magnesium chloride, said liquid catalyst having a pH lower than 8, thereby obtaining the conjugated diolefin directly.

4. A process for manufacturing a conjugated diolefin, which comprises contacting an olefinic hydroperoxide containing at least 4 carbon atoms per molecule with a liquid catalyst consisting essentially of 90 to 100% by weight of water and less than 10% by weight of zinc chloride, said liquid catalyst having a pH lower than 8, thereby obtaining the conjugated diolefin directly.

5. A process for manufacturing a conjugated diolefin, which comprises contacting an olefinic hydroperoxide containing at least 4 carbon atoms per molecule with a liquid catalyst consisting essentially of 90 to 100% by weight of water and less than 10% by weight of magnesium sulfate, said liquid catalyst having a pH lower than 8, thereby obtaining the conjugated diolefin directly.

6. A process for manufacturing cyclohexadiene-1,3, which comprises contacting cyclohexenyl-(3) hydroperoxide with a liquid catalyst consisting essentially of water at a temperature of from 150° to 250° C., thereby obtaining cyclohexadiene-1,3 directly.

7. A process for manufacturing cyclohexadiene-1,3, which comprises contacting cyclohexenyl-(3) hydroperoxide, at a temperature of from 150° to 250° C., with a liquid catalyst consisting essentially of water having dissolved therein less than 10% by weight of magnesium chloride, thereby obtaining cyclohexadiene-1,3 directly.

8. A process of manufacturing cyclohexadiene-1,3, which comprises contacting cyclohexenyl-(3) hydroperoxide, at a temperature of from 150° to 250° C., with a liquid catalyst consisting essentially of water having dissolved therein less than 10% by weight of magnesium sulfate, thereby obtaining cyclohexadiene-1,3 directly.

9. A process for manufacturing a conjugated diolefin, which process comprises contacting a mixture consisting essentially of:
   (a) an olefinic hydroperoxide containing at least 4 carbon atoms per molecule, and
   (b) a solvent inert to the reactants and products, and having a boiling temperature higher than said conjugated diolefin,
with a liquid catalyst consisting essentially of 90 to 100% by weight of water and 0 to 10% by weight of a member of the group consisting of acids, magnesium chloride, magnesium sulfate, and zinc chloride, said liquid catalyst having a pH lower than 8, thereby obtaining the conjugated diolefin directly.

References Cited in the file of this patent

UNITED STATES PATENTS

| 2,678,338 | Linn | May 11, 1954 |
| 2,809,921 | Vesely et al. | Oct. 15, 1957 |
| 2,967,897 | Sharp et al. | Jan. 10, 1961 |
| 3,013,068 | De LaMare et al. | Dec. 12, 1961 |

OTHER REFERENCES

Liquid Phase Oxidation of Phenylcyclohexane With Oxygen and the Decomposition of 1-Phenylcyclohexyl Peroxide, by S. Akiyoshi et al., Kogyo Kagaku Zasshi, vol. 60 pp. 268–72, 1957 (abstracted in Chem. Abstracts, column 8058e, vol. 53).